(12) United States Patent
Kawashima

(10) Patent No.: US 9,459,134 B2
(45) Date of Patent: Oct. 4, 2016

(54) TABLE TOP COMBINATION WEIGHER

(75) Inventor: Takaaki Kawashima, Hyogo (JP)

(73) Assignee: YAMATO SCALE CO., LTD., Akashi-shi, Hyogo (JP)

(*) Notice: Subject to any disclaimer, the term of this patent is extended or adjusted under 35 U.S.C. 154(b) by 161 days.

(21) Appl. No.: 13/982,194

(22) PCT Filed: Jun. 2, 2011

(86) PCT No.: PCT/JP2011/003118
§ 371 (c)(1),
(2), (4) Date: Oct. 15, 2013

(87) PCT Pub. No.: WO2012/101685
PCT Pub. Date: Aug. 2, 2012

(65) Prior Publication Data
US 2014/0027186 A1    Jan. 30, 2014

(30) Foreign Application Priority Data

Jan. 28, 2011 (JP) .................. 2011-016835

(51) Int. Cl.
| | | |
|---|---|---|
| *G01G 19/387* | (2006.01) | |
| *G01G 11/18* | (2006.01) | |
| *G01G 19/393* | (2006.01) | |
| *G01G 13/16* | (2006.01) | |

(Continued)

(52) U.S. Cl.
CPC ............. *G01G 19/393* (2013.01); *G01G 11/12* (2013.01); *G01G 13/08* (2013.01); *G01G 13/16* (2013.01)

(58) Field of Classification Search
CPC .. G01G 19/387; G01G 19/393; G01G 11/12; G01G 13/08; G01G 13/16
See application file for complete search history.

(56) References Cited

U.S. PATENT DOCUMENTS

| 4,442,910 A | 4/1984 | Mikami | |
|---|---|---|---|
| 4,821,820 A * | 4/1989 | Edwards et al. ........... 177/25.18 |

(Continued)

FOREIGN PATENT DOCUMENTS

| GB | 1 448 231 A | 9/1976 |
|---|---|---|
| JP | 57-8530 | 1/1982 |

(Continued)

OTHER PUBLICATIONS

Computer translation of JPS57-008530U, Jun. 9, 2016.*

(Continued)

*Primary Examiner* — Randy W Gibson
(74) *Attorney, Agent, or Firm* — Marshall, Gerstein & Borun LLP

(57) ABSTRACT

A combination weigher according to an embodiment of the present invention comprises a plurality of weighing conveyors which are manually fed with objects and conveys the objects fed manually; a plurality of weight sensors to correspond to the weighing conveyors to measure weights of the objects; a control section which finds a discharge combination including a combination of the weighing conveyors holding the objects in which a total weight thereof falls within a target weight range, and activates the weighing conveyors selected to make up the discharge combination to convey the objects on the weighing conveyors in a first direction and discharge the objects from the weighing conveyors; and a collecting conveyor which is fed with the objects discharged from the one ends of the weighing conveyors, conveys the objects in a direction, and discharges the objects.

5 Claims, 3 Drawing Sheets

(51) Int. Cl.
*G01G 13/08* (2006.01)
*G01G 11/12* (2006.01)

(56) References Cited

U.S. PATENT DOCUMENTS

| | | | |
|---|---|---|---|
| 5,596,179 A * | 1/1997 | Sakaeda | 177/25.18 |
| 5,646,374 A | 7/1997 | Stapp et al. | |
| 6,401,936 B1 | 6/2002 | Isaacs et al. | |
| 6,811,023 B1 * | 11/2004 | Christiana et al. | 198/822 |
| 7,790,990 B2 * | 9/2010 | Kieselhorst | 177/25.18 |
| 9,079,721 B2 * | 7/2015 | Kawanishi | G01G 13/16 |
| 2004/0026218 A1 * | 2/2004 | Kotaki et al. | 198/825 |
| 2014/0027187 A1 * | 1/2014 | Kosaka | G01G 19/387 |
| | | | 177/25.18 |

FOREIGN PATENT DOCUMENTS

| | | |
|---|---|---|
| JP | 57-168026 | 10/1982 |
| JP | 59-95230 | 6/1984 |
| JP | 61-151430 A | 7/1986 |
| JP | 61-292525 | 12/1986 |
| JP | 61-294317 | 12/1986 |
| JP | 01-250830 | 5/1989 |
| JP | 6-24778 U | 4/1994 |
| JP | 6-28658 U | 4/1994 |
| JP | 07-146170 | 6/1995 |
| JP | 07-33139 | 7/1995 |
| JP | 09-113343 | 5/1997 |
| JP | 2005-315579 A | 11/2005 |
| JP | 2006-194722 A | 7/2006 |
| JP | 2006-214784 A | 8/2006 |
| JP | 2010-127627 A | 6/2010 |
| WO | WO-93/23724 A1 | 11/1993 |

OTHER PUBLICATIONS

International Search Report for PCT/JP2011/003118, mailed Jun. 28, 2011.
Office Action for Canadian Patent Application No. 2,822,782, dated Jan. 23, 2015.
Extended European Search Report for European Application No. 118567718.8, dated Oct. 22, 2014.
Office Action for Canadian Patent Application No. 2,822,782, mailed Oct. 6, 2015.

* cited by examiner

TABLE TOP COMBINATION WEIGHER

TECHNICAL FIELD

The present invention relates to a combination weigher which finds a combination in which a total weight of objects falls within a predetermined target weight range.

BACKGROUND ART

Combination weighers are roughly classified into an automatic combination weigher, a semiautomatic combination weigher and a hand-operated (manual) combination weigher, depending on a difference in a feeding method and a discharge method of objects with respect to a weighing unit. In the hand-operated combination weigher, feeding and discharging of the objects are performed manually by an operator. In the semiautomatic combination weigher, feeding of the objects is performed manually by the operator, while discharging of the objects is performed automatically (see e.g., Patent Literature 1). In the automatic combination weigher, feeding and discharging of the objects are performed automatically (mechanic control) (see e.g., Patent Literature 2).

For objects which are incapable of being fed automatically to a combination weigher or objects which are not suitable for use in the automatic feeding, the hand-operated combination weigher or the semiautomatic combination weigher is used.

In a conventional semiautomatic combination weigher, for example, a plurality of hoppers are aligned, and a single belt conveyor is placed under the plurality of hoppers. When the operator feeds objects to hoppers, the objects are weighed, discharge gates of hoppers selected to make up a combination in which a combination weight falls within a predetermined weight range are opened and closed to discharge the objects, the objects discharged from the hoppers are conveyed in one direction by a belt conveyor, and the objects are discharged to a subsequent-stage apparatus, such as a packaging machine.

CITATION LIST

Patent Literature

Patent Literature 1: Japanese Laid-Open Patent Application Publication No. 2006-214784
Patent Literature 2: Japanese Examined Utility Model Application Publication No. Hei. 7-33139

SUMMARY OF INVENTION

Technical Problem

In the conventional semiautomatic combination weigher, the objects are discharged from the hoppers selected to make up a combination onto the belt conveyor and conveyed thereon. Since the belt conveyor conveys the objects in a direction in which the hoppers are aligned, the hoppers are placed in a location which is much higher than the belt conveyor to prevent the objects being conveyed from contacting the hoppers. Because of this, a great impact is generated when the objects are dropped from the hoppers onto the belt conveyor. In view of this, the conventional semiautomatic combination weigher is not suitable for use in weighing of the objects which are broken or damaged easily. For example, if objects such as mushrooms having caps are dropped from the hoppers onto the belt conveyor, the caps are damaged easily, so that their commercial value will degrade, or the damaged objects will be unsalable products.

An operator must take care so that the objects do not get stuck in the discharge gates of the hoppers. An inexperienced operator or the like may feed the objects to the hoppers at an incorrect timing, which will result in, for example, a problem that the objects get stuck in the discharge gates of the hoppers. Thus, the operator who manipulates the conventional semiautomatic combination weigher is required to be trained, experienced, etc.

The present invention has been made to solve the above described problem, and an object of the present invention to provide a combination weigher which is capable of preventing damages to objects which are broken or damaged easily, due to an impact or the like when they are dropped.

Solution to Problem

To achieve the above described objective, according to an aspect of the present invention, a combination weigher comprises: a plurality of weighing conveyors which are manually fed with objects in a deactivated state in which the objects are not conveyed, and convey the objects fed manually; a plurality of weight sensors provided to correspond to the weighing conveyors, respectively, to measure weights of the objects held on the weighing conveyors; a combination unit for finding a discharge combination including a combination of the weighing conveyors holding the objects in which a total weight thereof falls within a target weight range, based on weight values of the weight sensors; a weighing conveyor control unit which activates the weighing conveyors selected to make up the discharge combination to convey the objects on the weighing conveyors in a first direction and discharge the objects from one ends of the weighing conveyors; and a collecting conveyor which is fed with the objects discharged from the one ends of the weighing conveyors, conveys the objects in a direction, and discharges the objects.

In accordance with this configuration, since the weighing conveyors for conveying the objects are used in the plurality of weighing units to which an operator feeds the objects, and the collecting conveyor collects the objects discharged from the one ends of the weighing conveyors and discharges the objects, a height (level) difference between the weighing conveyors and the collecting conveyor can be reduced, which can lessen an impact generated when the objects discharged from the weighing conveyors selected to make up the discharge combination are transferred onto the collecting conveyor. Because of this, it becomes possible to weigh the objects which are broken or damaged easily due to an impact, etc., generated when the objects are dropped, without causing damages to them. Since the operator has only to put the objects on the weighing conveyors in a work for feeding the objects, even an inexperienced operator can more easily carry out the work for feeding the objects than in a case where the objects are fed to the hoppers in the conventional combination weigher.

The plurality of weighing conveyors may constitute first and second weighing conveyor groups which are placed such that the collecting conveyor is interposed between the first and second weighing conveyor groups; wherein the weighing conveyors in each of the first and second weighing conveyor groups may be arranged in parallel; and wherein the weighing conveyors in each of the first and second weighing conveyor groups may be placed such that the collecting conveyor is positioned at the one ends of the weighing conveyors and a conveying direction of the weighing conveyors is perpendicular to a conveying direction of the collecting conveyor.

In accordance with this configuration, since the weighing conveyor groups are placed at both sides of the collecting conveyor, a length of the collecting conveyor can be reduced, a discharge time of the objects can be reduced, and the combination weigher can be made compact. Also, the operator can easily carry out the work for feeding the objects.

The collecting conveyor may be a belt conveyor in which a ring-shaped belt is rotatable and is a trough-type belt conveyor which conveys the objects in a state in which a center portion of the belt is concave relative to both edges of the belt.

In accordance with this configuration, since the trough-type belt conveyor is used as the collecting conveyor, the objects discharged from the weighing conveyors placed at both sides of the collecting conveyor can be collected to the center portion and discharged to the subsequent-stage apparatus. Thus, the objects can be fed to the subsequent-stage apparatus accurately.

The combination weigher may further comprise a proper weight determiner unit for determining whether or not a weight of the objects held in each of the weighing conveyors falls within a proper weight range based on each of the weight values of the weight sensors; and the weighing conveyor control unit may be configured to, based on a result of the determination of the proper weight determiner unit, activate the weighing conveyor holding the objects having the weight which does not fall within the proper weight range, to convey the objects in a direction opposite to the first direction, and to discharge the objects from the other end of the weighing conveyor.

In accordance with this configuration, since the weighing conveyor is caused to convey the objects having the weight which does not fall within the proper weight range in the opposite direction (direction opposite to the first direction) and discharges them, a combination including only the objects of an equal weight can be discharged when the objects are fed to each of the weighing conveyors one by one. In a case where a plurality of objects are fed to each of the weighing conveyors, by setting a proper weight range so that a weight range corresponding to the number of selection in a combination which provides a high combination weighing accuracy (planned number of weighing conveyors selected to make up a discharge combination) is attained, it becomes possible to easily form a combination of a weight which falls within a target weight range and lessen a frequency with which a combination failure occurs, in which no discharge combination exists.

The combination weigher may further comprise a proper weight determiner unit for determining whether or not a weight of the objects held in each of the weighing conveyors falls within a proper weight range based on each of the weight values of the weight sensors; and a notification device for performing notification of the weighing conveyor holding the objects having the weight which does not fall within the proper weight range, based on a result of the determination of the proper weight determiner unit.

In accordance with this configuration, since the operator is notified of the weighing conveyor holding the objects having the weight which does not fall within the proper weight range, the operator replaces the objects in that weighing conveyor to attain a weight which falls within the proper weight range. Thus, in a case where the objects are fed to each of the weighing conveyors, one by one, a combination including only the objects of an equal weight can be discharged. In a case where a plurality of objects are fed to each of the weighing conveyors, by setting a proper weight range so that a weight range corresponding to the number of selection in a combination which provides a high combination weighing accuracy (planned number of weighing conveyors selected to make up a discharge combination) is attained, it becomes possible to easily form a combination of a weight which falls within a target weight range and lessen a frequency with which a combination failure occurs, in which no discharge combination exists.

Advantageous Effects of Invention

The present invention has the above described configuration, and can achieve advantages that it is possible to provide a combination weigher which is capable of preventing damages to objects which are broken or damaged easily, due to an impact or the like generated when they are dropped.

The above and further objects, features and advantages of the present invention will more fully be apparent from the following detailed description of preferred embodiments with accompanying drawings.

DESCRIPTION OF EMBODIMENTS

Hereinafter, a preferred embodiment of the present invention will be described with reference to the drawings. Throughout the drawings, the same or corresponding components are designated by the same reference symbols, and will not be described in repetition. The present invention is not limited to the embodiment described below.

(Embodiment)

Figure 1A:
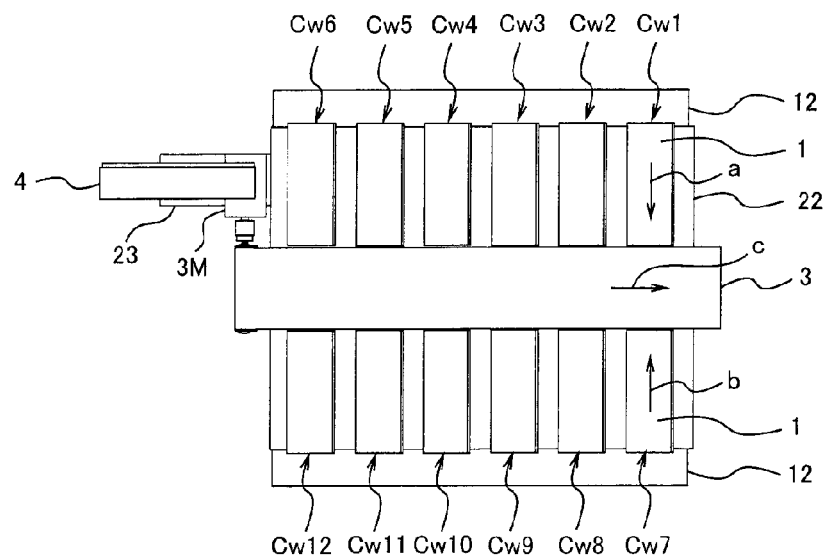
FIG. 1A is a plan view showing an exemplary combination weigher according to an embodiment of the present invention, when viewed from above.
Figure 1B:
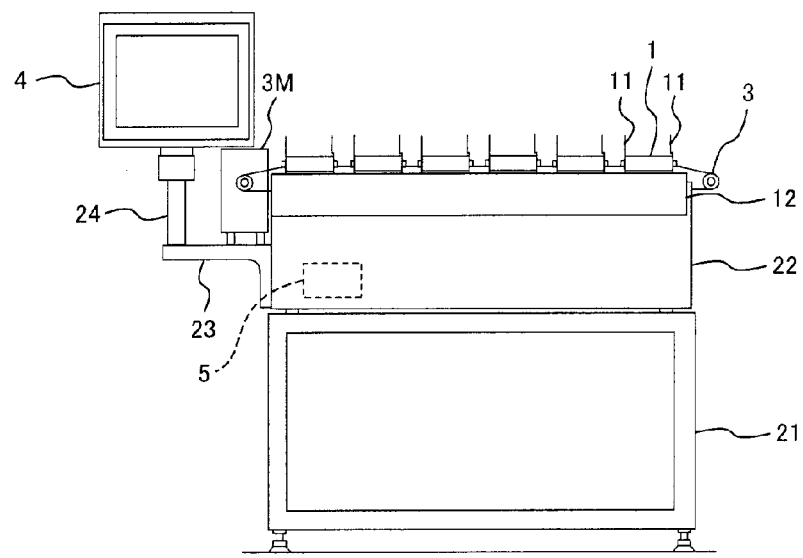
FIG. 1B is a front view of the combination weigher.
Figure 1C:
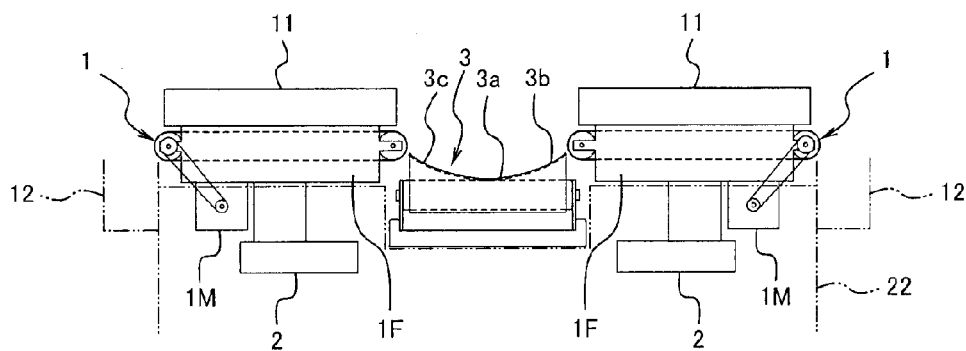
FIG. 1C is a schematic view showing a detailed structure of a weighing unit and a collecting conveyor in the combination weigher.
Figure 2:
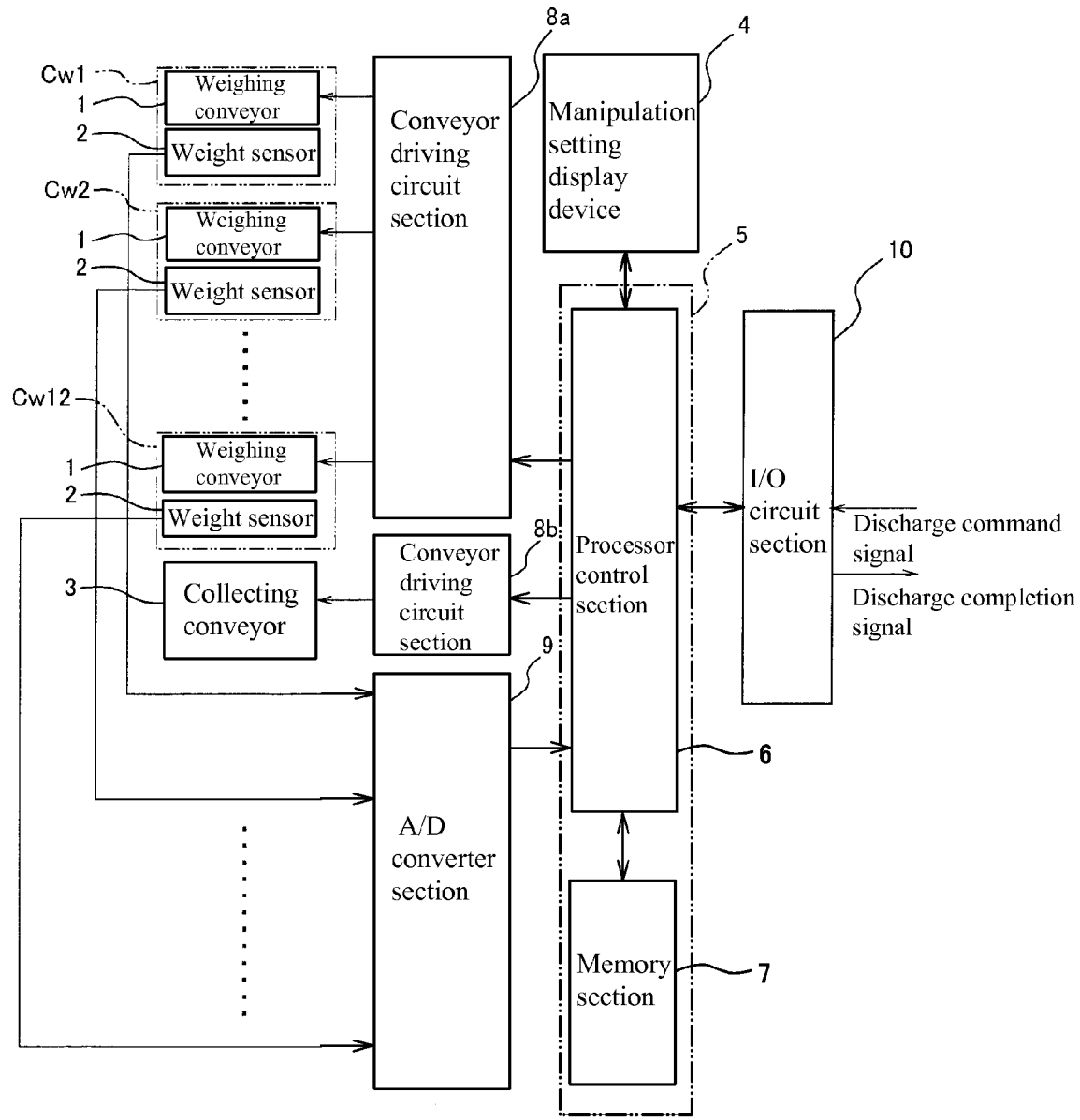
FIG. 2 is a block diagram showing a schematic configuration of the exemplary combination weigher according to the embodiment of the present invention.

FIG. 1 is a schematic view showing an external appearance of an exemplary combination weigher according to an embodiment of the present invention, in which Fig. 1A is a plan view of the combination weigher when viewed from above, FIG. 1B is a front view of the combination weigher, and FIG. 1C is a schematic view showing a detailed structure of a weighing unit and a collecting conveyor in the combination weigher. FIG. 2 is a block diagram showing a schematic configuration of the exemplary combination weigher according to the embodiment of the present invention.

This combination weigher includes a plurality of weighing units Cw1 to Cw12, a collecting conveyor 3, a manipulation setting display device 4, a controller 5, etc.

Each of the plurality of weighing units Cw1 to Cw12 includes a weighing conveyor 1 constituted by a belt conveyor, and a weight sensor 2 constituted by a load cell, or the like, supporting the weighing conveyor 1, to measure a weight of the objects put on the weighing conveyor 1. Each of the weighing conveyors 1 is provided with a pair of guide plates 11 for preventing the objects from dropping out of both sides of the weighing conveyor 1. Specifically, for example, as shown in FIG. 1C, the guide plate 11 is mounted to a conveyor frame 1F. A driving motor 1M of the weighing conveyor 1 is attached to a lower surface of the conveyor frame 1F of the weighing conveyor 1. The weight sensor 2 is fastened to a fastening member (not shown) inside of an apparatus body 22, and the conveyor frame 1F is attached to an upper portion thereof via a mounting member. That is, the weight sensor 2 supports the weighing conveyor 1 including the pair of guide plates 11 and the driving motor 1M.

A collecting conveyor 3 is placed between six weighing units Cw1 to Cw6 and six weighing units Cw7 to Cw12. The six weighing conveyors 1 of the weighing units Cw1 to Cw6 are arranged in parallel at one side of the collecting conveyor 3. The weighing conveyors 1 of the weighing units Cw1 to Cw6 are placed such that a conveying direction (direction of arrow a) of the weighing conveyors 1 is perpendicular to a conveying direction (direction of arrow c) of the collecting conveyor 3. The six weighing conveyors 1 of the weighing units Cw7 to Cw12 are arranged in parallel at the other side of the collecting conveyor 3. The weighing conveyors 1 of the weighing units Cw7 to Cw12 are placed such that a conveying direction (direction of arrow b) of the weighing conveyors 1 is perpendicular to the conveying direction of the collecting conveyor 3.

As shown in FIG. 1C, the collecting conveyor 3 is a trough-type belt conveyor configured such that both edge portions (widthwise both end portions of the belt) 3a and 3b of an upper surface portion thereof (conveying surface) of the ring-shaped belt rotating are held up by support members (not shown), and the objects are conveyed in a state in which a center portion 3c is concave relative to the both edge portions 3a and 3b of the upper surface portion. The collecting conveyor 3 may be a belt conveyor having a flat conveying surface. In that case, guide plates such as the guide plates 11 of the weighing conveyor 1 may be provided at both edge portions of the belt as required.

A recovery container 12 is provided at the weighing conveyors 1 of the weighing units Cw1 to Cw6 at an opposite side of the collecting conveyor 3. In addition, a recovery container 12 is provided at the weighing conveyors 1 of the weighing units Cw7 to Cw12 at an opposite side of the collecting conveyor 3.

In the present embodiment, the collecting conveyor 3 conveys the objects in the direction as indicated by, for example, the arrow c. In this case, a subsequent-stage apparatus (not shown) is installed subsequently to the collecting conveyor 3 in the direction of the arrow c (right side in FIG. 1B), and the objects conveyed by the collecting conveyor 3 are fed to the subsequent-stage apparatus.

The apparatus body 22 is mounted to a platform 21. The collecting conveyor 3 is mounted onto the apparatus body 22. A support member 23 is mounted to a side portion of the apparatus body 22. The manipulation setting display device 4 is attached to the support member 23 via a support column 24. A driving motor 3M of the collecting conveyor 3 is mounted to the support member 23.

The apparatus body 22 accommodates conveyor driving circuit sections 8a and 8b, an A/D converter section 9, a control section 5, an I/O circuit section 10, etc., which are shown in FIG. 2.

Each of the weighing conveyors 1 is supported by the weight sensor 2 such as the load cell. The weight sensor 2 measures the weight of the objects on the weighing conveyor 1. The A/D converter section 9 converts a weight value (analog weight signal) measured by the weight sensor 2 into a digital signal, which is sent to the control section 5.

The control section 5 is constituted by, for example, a microcontroller, etc. The control section 5 includes a processor control section 6 including a CPU or the like, and a memory section 7 including a RAM, a ROM, etc. Running programs, data of operation parameters, weight data, etc., are stored in the memory section 7. A combination unit, a weighing conveyor control unit, a collecting conveyor control unit, and a proper weight determiner unit are constituted by the control section 5. The control section 5 may be constituted by a single controller for executing centralized control, or by a plurality of controllers cooperating with each other to execute decentralized control.

Is the control section 5, the processor control section 6 executes the running programs stored in the memory section 7 to control the overall combination weigher, and performs a combination process, etc., as will be described later. For example, the control section 5 continuously obtains the weight value measured by the weight sensor 2 attached with each weighing conveyor 1 as a digital value via the A/D converter section 9, and stores the digital value in the memory section 7 as necessary. The control section 5 causes the conveyor driving circuit section 8a to control a driving operation of each weighing conveyor 1, and causes the conveyor driving circuit section 8b to control a driving operation of the collecting conveyor 3. The control section 5 receives a discharge command signal from the subsequent-stage apparatus (not shown), and outputs a discharge completion signal to the subsequent-stage apparatus, via the I/O circuit section 10. The control section 5 receives a signal from the manipulation setting display device 4, and outputs a signal such as data to be displayed, to the manipulation setting display device 4.

When an operator puts the objects on the weighing conveyor 1 in a deactivated state in which the objects are not conveyed, the control section 5 determines whether or not a weight of the objects on the weighing conveyor 1 which is obtained as the weight value of the weight sensor 2 falls within a predetermined proper weight range. If the control section 5 determines that the weight does not fall within the proper weight range, it causes that weighing conveyor 1 to convey the objects in a direction opposite to the normal conveying direction (direction a, b) (convey the objects in an opposite direction), to discharge the objects to the recovery container 12.

The combination process performed by the control section 5 will be described. In this combination process, the control section 5 performs combination calculation based on the weights of the objects on the weighing conveyors 1 which are obtained from the weight values of the weight sensors 2, finds all combinations in which total weights (combination weights) of the objects fall within a target weight range (allowable range with respect to a combination target weight), and determines one combination as a discharge combination. If there exist plural combinations in which total weights fall within the target weight range, the control section 5 determines a combination in which an absolute value of a difference between its combination weight and the combination target weight is smallest as the discharge combination, among the plural combinations. The weighing conveyor 1 holding the objects having a weight which does not fall within the proper weight range does not participate in the combination calculation in the combination process, is not selected as the discharge combination, and the objects on that weighing conveyor 1 are discharged to the recovery container 12 as described above. The objects on the weighing conveyors 1 selected to make up the discharge combination are conveyed by these weighing conveyors 1, and are discharged onto the collecting conveyor 3.

The manipulation setting display device 4 includes, for example, a touch-screen type display (display device). The operator can perform manipulation of starting and stopping of running of the combination weigher, setting of running parameters of the combination weigher, etc., on a screen of this display. In addition, the manipulation setting display device 4 is able to display a result (combination weight, etc.) of the combination process performed by the control section 5, on the screen of the display.

Figure 3:
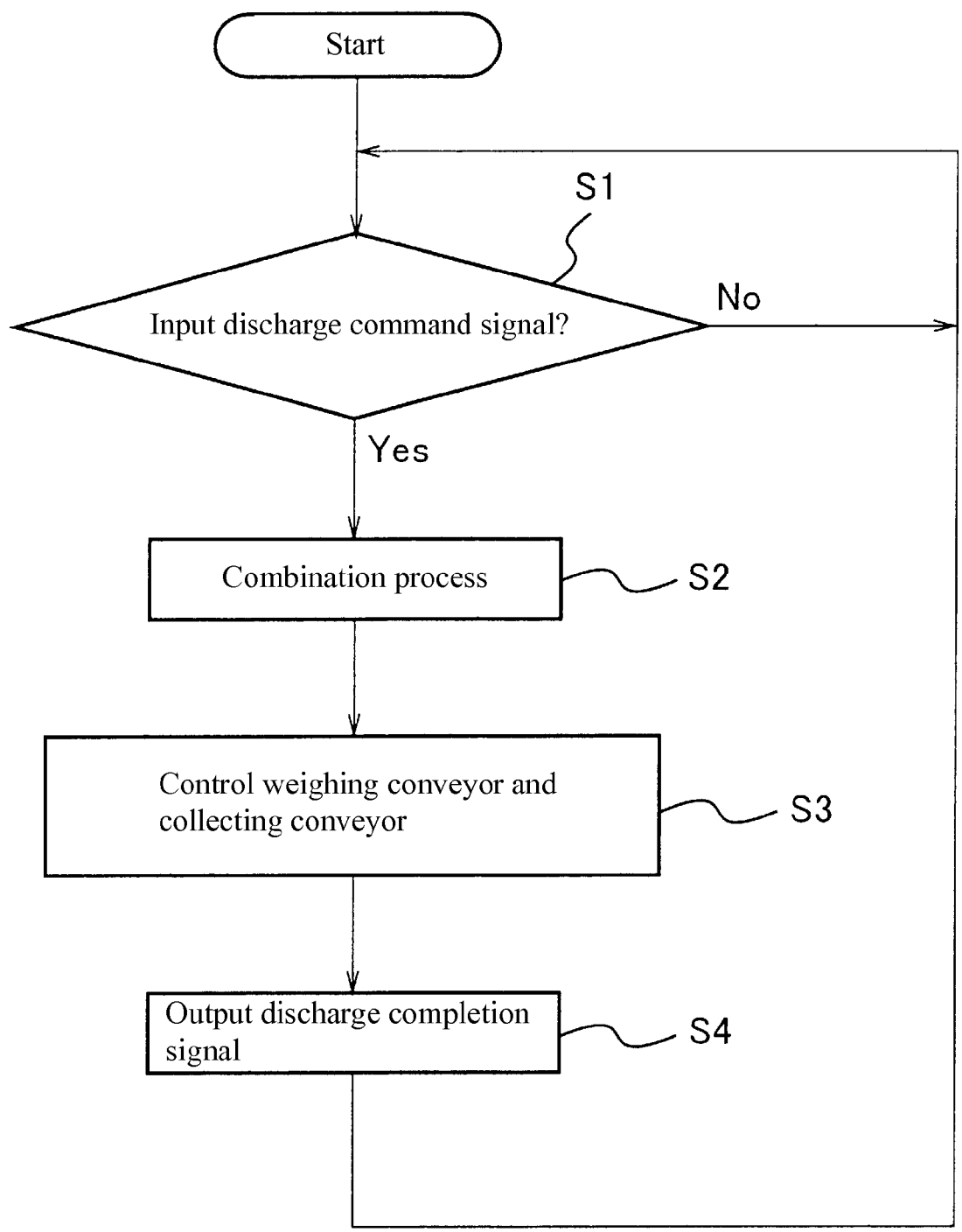
FIG. 3 is a flow chart showing an exemplary operation of the exemplary combination weigher according to the embodiment of the present invention.

An operation of the combination weigher of the present embodiment configured as described above will be described. FIG. 3 is a flow chart showing an exemplary operation of the exemplary combination weigher according to the embodiment. The operation of the combination weigher is implemented by the process executed by the control section 5. Information required to control the operation of the combination weigher, etc., are all stored in the memory section 7. The objects are, for example, agricultural product. For example, the objects are mushroom such as eryngii mushroom.

The operator feeds (puts) the objects, for example, one by one, onto the weighing conveyor 1 on which there are no objects, in the deactivated state in which the objects are not conveyed. Although not shown, the control section 5 obtains the weight values of the weight sensors 2 at specified time intervals from the A/D converter section 9, and knows the weighing conveyors 1 holding the objects and the weight values of the objects of the weighing conveyors 1 based on the weight values of the weight sensors 2. When the control section 5 knows the weighing conveyors 1 holding the objects, the control section 5 compares the weight value to a preset loading detected reference value (e.g., 6g), it determines that the corresponding weighing conveyor 1 holds the objects when the weight value is equal to or greater than the loading detected reference value, while it determines that the corresponding weighing conveyor 1 is not holding the objects when the weight value is less than the loading detected reference value. The control section 5 determines whether or not the weight of the objects on the weighing conveyor 1 which is not selected to make up a discharge combination and is holding the objects falls within a predetermined proper weight range. If the control section 5 determines that the weight of the objects does not fall within the proper weight range, it causes the corresponding weighing conveyor 1 to promptly convey the objects in the opposite direction for a specified time and discharge the objects onto the recovery container 12. In the control section 5, the loading detected reference value, an upper limit value of the proper weight range, and a lower limit value of the proper weight range are set and stored in the memory section 7.

When the control section 5 receives a discharge command signal from the subsequent-stage apparatus in step S1, the process goes to step S2. In step S2, the control section 5 performs the above stated combination process, to find the discharge combination. Then, in step S3, the control section 5 activates the weighing conveyors 1 selected to make up the discharge combination for a first predetermined time to transfer the objects from these weighing conveyors 1 to the collecting conveyor 3, and activates the collecting conveyor 3 for a second predetermined time to transfer the objects transferred from the weighing conveyors 1 to the collecting conveyor 3, to the subsequent-stage apparatus. Then, the control section 5 outputs a discharge completion signal to the subsequent-stage apparatus at a predetermined timing (step S4). The above stated operation is repeated.

The subsequent-stage apparatus is configured to output the discharge command signal at a predetermined timing to the combination weigher and start a predetermined operation upon reception of the discharge completion signal from the combination weigher. As the subsequent-stage apparatus, for example, there is placed a packaging machine of bag charging type in which the objects are charged into bags. Or, as the subsequent-stage apparatus, for example, there is placed a conveyor apparatus which intermittently and horizontally moves a plurality of trays (shallow boxes) joined to each other in an annular shape. In this case, the objects discharged from the collecting conveyor 3 are fed to each tray, and an operator who takes charge of the conveyor apparatus charges the objects put on each tray into one pack. In this case, for example, the conveyor apparatus outputs the discharge command signal to the combination weigher at a time point when the conveyor apparatus moves the tray and moves an empty tray to a discharge port of the collecting conveyor 3, moves the tray after a passage of a predetermined time after the discharge completion signal is received from the combination weigher, and moves a next empty tray to the discharge port of the collecting conveyor 3.

In the present embodiment, the weighing conveyors 1 are used in the plurality of weighing units Cw1 to Cw12 for weighing the weights of the objects, and the objects discharged from one ends of the weighing conveyors 1 are collected onto the collecting conveyor 3 and discharged to the subsequent-stage apparatus. Therefore, a height (level) difference between the weighing conveyors 1 and the collecting conveyor 3 can be reduced, which can lessen an impact generated when the objects discharged from the weighing conveyors 1 selected to make up the discharge combination are transferred onto the collecting conveyor 3. As a result, it becomes possible to weigh the objects which are broken or damaged easily due to an impact, etc., generated when the objects are dropped, without causing damages to them.

In the present embodiment, since the weighing conveyors 1 are placed at both sides of the collecting conveyor 3, a length of the collecting conveyor 3 can be reduced, and hence a discharge time of the objects can be reduced. In addition, the combination weigher can be made compact, and the operator can easily carry out a work for feeding the objects. Since the operator has only to put the objects on the weighing conveyors 1 in the work for feeding the objects, even an inexperienced operator can carry out the work for feeding the objects, more easily than in a case where the objects are fed to the hoppers in the conventional combination weigher. Alternatively, the weighing conveyors 1 may be placed at one side of the collecting conveyor 3. However, in that case, the length of the collecting conveyor 3 for placing the weighing conveyors 1 of a predetermined number increases, and therefore the discharge time of the objects increases. In view of this, preferably, the weighing conveyors 1 are placed at both sides of the collecting conveyor 3 as described above.

As the collecting conveyor 3, the trough-type belt conveyor in which the conveying surface has the concave center portion is used. Therefore, the objects discharged from the weighing conveyors 1 placed at both sides of the collecting conveyor 3 can be collected to the center portion and discharged to the subsequent-stage apparatus. Thus, the objects can be fed to the subsequent-stage apparatus accurately. For example, in the case where the subsequent-stage apparatus is the packaging machine, the objects can be charged into the bag such that the objects do not spill out of the bag. In the case where the subsequent-stage apparatus is the conveyor apparatus, the objects can be put onto the tray such that the objects do not spill out of the tray.

Since the weighing conveyor 1 is caused to convey the objects having the weight which does not fall within the proper weight range in the opposite direction and discharges them to the recovery container 12, in the present embodiment, a combination including only the objects of an equal weight can be discharged in a case where the objects are put on each of the weighing conveyors 1, one by one, as described above. In a case where a plurality of objects are put on each of the weighing conveyors 1, by setting a proper weight range so that a weight range corresponding to the number of selection in a combination which provides a high combination weighing accuracy (planned number of weighing conveyors 1 selected to make up a discharge combination) is attained, it becomes possible to easily form a combination of a weight which falls within a target weight range and lessen a frequency with which a combination failure occurs, in which a combination having a weight which falls within the target weight range does not exist in the combination calculation. When the number of selection in the combination is ½ of a total number (N) of the weighing conveyors 1, the number of combinations in the combination calculation is greatest. Therefore, a combination of a weight which falls within the target weight range is easily formed, and as a result, a high combination weighing accuracy is attained. For example, the number of selection in the combination may be equal to or greater than (N/2−k) and equal to or less than (N/2+k) (k is a predetermined value which is 1, 2, etc.), and the proper weight range may be such that a value of (combination target weight÷(N/2+k)) is a lower limit value and a value of (combination target weight÷(N/2−k)) is an upper limit value.

Although in the present embodiment, the weighing conveyor 1 is caused to convey the objects having a weight which does not fall within the proper weight range, in the opposite direction, to discharge them to the recovery container 12, the operator may remove the objects having a weight which does not fall within the proper weight range. In this case, the weighing conveyor 1 holding the objects having a weight which does not fall within the proper weight range may be kept in a deactivated state, and a notification device may be provided to notify the operator of this weighing conveyor 1. For example, the notification device may be configured in such a manner that display lights are provided to respectively correspond to the weighing conveyors 1 with a one-to-one correspondence, and the control section 5 causes the display light corresponding to the weighing conveyor 1 holding the objects having a weight which does not fall within the proper weight range, to be lighted or brink. Or, another configuration may be used so long as the operator can be notified of the objects having a weight which does not fall within the proper weight range.

Although in the present embodiment, the combination weigher is configured to initiate the combination process upon reception of the discharge command signal from the subsequent-stage apparatus, the present invention is not limited to this. For example, the combination weigher may be configured to perform the combination process at preset time intervals, and to activate the weighing conveyors 1 selected to make up a discharge combination and the collecting conveyor 3 to discharge the objects to the subsequent-stage apparatus upon reception of the discharge command signal. Time required for the combination process is about 10 ms. Therefore, even when the combination process is initiated after reception of the discharge command signal, like the present embodiment, an actual weighing cycle is not substantially affected. The combination weigher is preferably configured to initiate the combination process after reception of the discharge command signal like the present embodiment, because the number of weight values used in the combination calculation can be increased, and the combination weighing accuracy can be improved.

The collecting conveyor 3 may be configured to be activated all the time. A motor for activating the conveyor does not consume electric power in a deactivated state, and unnecessary electric power is consumed to activate the motor. Therefore, it is desirable to activate the collecting conveyor 3 such that electric power consumption is less as a whole.

Although in the present embodiment, the driving motor 1M is mounted to the lower surface of the conveyor frame 1F of the weighing conveyor 1, and the weight sensor 2 supports the weighing conveyor 1 including the driving motor 1M, the weight sensor 2 may support the weighing conveyor 1 except for the driving motor 1M. In this case, the driving motor 1M is mounted to a member which is not supported on the weight sensor 2. For example, a coupling mechanism for coupling the driving motor 1M to a driving roller of the weighing conveyor 1 is configured in such a manner that the rotational power of the driving motor 1M is transmitted to the driving roller of the weighing conveyor 1 only when the weighing conveyor 1 is activated (objects are conveyed), and the driving motor 1M is physically separated from the driving roller of the weighing conveyor 1 when the weighing conveyor 1 is deactivated (objects are not conveyed), to prevent a load caused by the driving motor 1M from being exerted on the weight sensor 2. And, the weight sensor 2 measures the weight of the objects on the weighing conveyor 1 when the weighing conveyor 1 is deactivated. The above configuration may be used.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

The present invention is useful as a combination weigher, etc., which can prevent damages to objects which are broken or damaged easily, due to an impact or the like, generated when they are dropped.

REFERENCE SIGNS LIST

1 weighing conveyor
2 weight sensor
3 collecting conveyor
4 manipulation setting display device
5 control section

The invention claimed is:
1. A combination weigher comprising:
a plurality of weighing conveyors which are manually fed with objects in a deactivated state in which the objects are not conveyed, and convey the objects fed manually, each of the plurality of weighing conveyors being bounded by a pair of guide plates arranged to prevent the objects from dropping off either side of the weighing conveyors;

a plurality of weight sensors provided to correspond to the weighing conveyors, respectively, to measure weights of the objects held on the weighing conveyors;

a combination unit for finding a discharge combination including a combination of the weighing conveyors holding the objects in which a total weight thereof falls within a target weight range, based on weight values of the weight sensors;

a weighing conveyor control unit which activates the weighing conveyors selected to make up the discharge combination to convey the objects on the weighing conveyors in a first direction and discharge the objects from one ends of the weighing conveyors; and a collecting conveyor which is fed with the objects discharged from the one ends of the weighing conveyors, conveys the objects in a direction, and discharges the objects, and a control unit which obtains weight values of the plurality of weight sensors at specified time intervals, compares the weight values to a preset loading detected reference value, and determines that the weighing conveyors are holding the objects corresponding to the weight sensors outputting the weight values being equal to or greater than the loading detected reference value;

wherein the combination unit finds the discharge combination based on the weight values of the weight sensors corresponding to the weighing conveyors determined as holding the objects, and wherein the collecting conveyor being placed such that a conveying surface thereof is lower than conveying surfaces of the weighing conveyors.

2. The combination weigher according to claim 1, wherein the plurality of weighing conveyors constitute first and second weighing conveyor groups which are placed such that the collecting conveyor is interposed between the first and second weighing conveyor groups;

wherein the weighing conveyors in each of the first and second weighing conveyor groups are arranged in parallel; and wherein the weighing conveyors in each of the first and second weighing conveyor groups are placed such that the collecting conveyor is positioned at the one ends of the weighing conveyors and a conveying direction of the weighing conveyors is perpendicular to a conveying direction of the collecting conveyor.

3. The combination weigher according to claim 2, wherein the collecting conveyor is a belt conveyor in which a ring-shaped belt is rotatable and is a trough-type belt conveyor which conveys the objects in a state in which a center portion of the belt is concave relative to both edges of the belt.

4. The combination weigher according to claim 1, further comprising:

a proper weight determiner unit for determining whether or not a weight of the objects held in each of the weighing conveyors falls within a proper weight range based on each of the weight values of the weight sensors;

wherein the weighing conveyor control unit is configured to, based on a result of the determination of the proper weight determiner unit, activate the weighing conveyor holding the objects having the weight which does not fall within the proper weight range to convey the objects in a direction opposite to the first direction, and to discharge the objects from the other end of the weighing conveyor.

5. The combination weigher according to claim 1, further comprising:

a proper weight determiner unit for determining whether or not a weight of the objects held in each of the weighing conveyors falls within a proper weight range based on each of the weight values of the weight sensors; and a notification device for performing notification of the weighing conveyor holding the objects having the weight which does not fall within the proper weight range, based on a result of the determination of the proper weight determiner unit.

* * * * *